United States Patent [19]

Gadkaree et al.

[11] Patent Number: 4,774,209

[45] Date of Patent: Sep. 27, 1988

[54] MULLITE CERAMIC WHISKER COMPOSITE ARTICLE EXHIBITING HIGH-TEMPERATURE STRENGTH

[75] Inventors: Kishor P. Gadkaree, Big Flats; K. Pattabhirami Reddy, Corning, both of N.Y.

[73] Assignee: Corning Glass Works, Corning, N.Y.

[21] Appl. No.: 101,798

[22] Filed: Sep. 28, 1987

Related U.S. Application Data

[62] Division of Ser. No. 6,802, Jan. 27, 1987, abandoned.

[51] Int. Cl.$^4$ .................... C04B 35/56; C04B 35/48
[52] U.S. Cl. ........................................ 501/89; 501/95; 501/105
[58] Field of Search ............... 501/89, 95, 105

[56] References Cited

U.S. PATENT DOCUMENTS

| | | | |
|---|---|---|---|
| 2,842,447 | 8/1958 | Scholtzhauer et al. | 501/107 |
| 4,421,861 | 12/1983 | Claussen et al. | 501/103 |
| 4,519,359 | 5/1985 | Dworek et al. | 123/668 |
| 4,543,345 | 9/1985 | Wei | 501/95 |
| 4,657,877 | 4/1987 | Becher | 501/89 |

OTHER PUBLICATIONS

Boch et al., "Preparation and Properties of Reaction-Sintered Mullite Ceramics," Mat'l. Sci. Eng., 71 (1985) 39–48.

Prochazka et al., "Microstructure of Sintered Mullite-Zirconia Composites," Communications Am. Cer. Soc. (Aug. 1983) C125–127.

Claussen et al., "Mechanical Properties of Sintered, In Situ-Reacted Mullite-Zirconia Composites," *J. Am. Cer. Soc.*, 63(3-4)228–9.

Claussen et al., "Whisker-Reinforced Oxide Ceramics," *Journal de Physique, Colloque C1*, supplement 2, vol. 47, Feb. 1986, pp. C1693–C1702.

P. F. Becher et al., "Toughening of Ceramics by Whisker Reinforcement," *Fracture Mechanics of Ceramics*, vol. 7, (Plenum Press, 1986) pp. 61–73.

Primary Examiner—Mark L. Bell
Attorney, Agent, or Firm—Kees van der Steere

[57] ABSTRACT

Whisker-reinforced zirconia-mullite ceramic articles exhibiting excellent high-temperature modulus of rupture strength and good toughness are provided from batches comprising the free oxides $ZrO_2$, $SiO_2$ and $Al_2O_3$ in combination with SiC whiskers for reinforcement. Due to the fine oxide particle sizes attainable and the fact that the mullite is formed in situ in the consolidation process, dense, whisker-reinforced mullite composite articles exhibiting excellent high-temperature strength and toughness may conveniently be obtained.

4 Claims, 1 Drawing Sheet

MULLITE CERAMIC WHISKER COMPOSITE ARTICLE EXHIBITING HIGH-TEMPERATURE STRENGTH

This is a division of application Ser. No. 006,802, filed Jan. 27, 1987 now abandoned.

The present invention relates generally to whisker-reinforced composite ceramic products, and particularly to composite mullite ceramic materials and methods for making them wherein the mullite is toughened by the incorporation of a combination of zirconia crystals and refractory inorganic whiskers therein.

The use of inorganic whiskers and fibers to reinforce glasses, glass-ceramics and ceramics is well known. Whiskers have frequently been characterized in the literature as relatively short, single-crystal fibers of small diameter (typically less than 100 microns), while fibers are considered to be multicrystalline or amorphous and are generally longer than whiskers, so that they can be used in woven or otherwise interlocking bundles, tows or cloth.

The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material.

Whiskers are thought to impart strengthening by a similar mechanism, but load transfer to whiskers by the matrix is more limited due to the limited length and aspect ratio of the whiskers. Theoretically, a whisker which is sufficiently short will not be loaded to the breaking point by the matrix under stress, and therefore full advantage cannot be taken of the high strength of the whiskers. However, since whiskers are typically incorporated as a randomly dispersed phase in a selected glass or ceramic matrix, rather than in a preferential alignment as with fibers, the physical properties of the composites are generally more isotropic.

Among the whiskers and fibers which have been suggested for use as reinforcement for nonmetal matrix materials are silicon carbide, silicon nitride, alumina and carbon whiskers. The use of such whiskers to impart improved strength and toughness to alumina, boron carbide, and mullite ceramics is described in U.S. Pat. No. 4,543,345. As described in that patent, some improvements in room temperature toughness and fracture strength can be provided in mullite bodies by simply mixing silicon carbide whiskers with finely divided mullite and hot pressing the mixture to obtain consolidation thereof.

Mullite is a refractory crystalline aluminosilicate material ($3Al_2O_3.2SiO_2$) which offers advantageous behavior at high temperatures, including relatively low thermal expansion, a high melting point, good hardness, good creep resistance and superior resistance to chemical attack. Thus strategies to improve the toughness of this material, i.e., its resistance to crack propagation, and its fracture strength, particularly at elevated temperatures, have been an important focus of continued development.

It has been shown that mullite can be noticeably toughened by the inclusion of zirconia crystal grains therein. Thus N. Claussen et al, in "Mechanical Properties of Sintered, In Situ Reacted Mullite-Zriconia Composites", *J. Am. Cer. Soc.*, 63, (3-4), 228-9 (1980), describes the development of zirconia-toughened mullite ceramics produced from mixtures of zircon ($ZrSiO_4$) and $Al_2O_3$ which can be converted to mullite and zirconia by heating. This approach to the production of zirconia-toughened mullite was reportedly effective to increase the density of the consolidated mullite samples, which are somewhat difficult to consolidate to full density due the crystalline habit of mullite.

U.S. Pat. No. 4,421,861 further describes mullite products produced from zircon and alumina, while U.S. Pat. No. 4,519,359 describes the use of toughened mullite such as produced in accordance with these methods, for example, to construct a cylinder head component of an internal combustion engine. One disadvantage attending the use of zircon-alumina batches to produce such products, however, is that zirconia levels are not independently variable but rather fixed by the stoichiometry of zircon.

An alternative method for preparing zirconia-toughened mullite has been described by S. Prochazka et al in "Microstructure of Sintered Mullite-Zirconia Composites", *Communications of the American Ceramic Society*, (August 1983), C125–C127. That method involves the production of dense toughened mullite bodies using attrition milled fused mullite powders and a zirconia additive. However, no information concerning the properties of the mullite products is given.

Notwithstanding the foregoing developments, improved methods for preparing tough mullite ceramic products exhibiting high density, freedom from residual glassy phases, and high strength remain of considerable interest. Specifically, process improvements which would facilitate the consolidation of tough mullite products to high density at reduced temperatures and/or pressures, and preferably without the use of sintering aids such as MgO, CaO, or $TiO_2$ which tend to promote the formation of glassy grain boundaries, would be desirable.

It is therefore a principal object of the present invention to provide a process for the production of dense, tough, strong mullite products.

It is a further object of the invention to provide toughened mullite products which exhibit optimum strength and toughness at both room temperature and at the elevated temperatures to be encountered in use.

It is a further object of the invention to provide a process for the production of dense tough mullite products wherein the particle size of the zirconia, silica and alumina starting materials are controlled to promote more effective consolidation of the batch materials into dense mullite.

Other objects and advantages of the invention will become apparent from the following description thereof.

SUMMARY OF THE INVENTION

In accordance with the present invention, a ceramic batch for the production of a toughened mullite ceramic article is provided which comprises, instead of powdered mullite or a mixture of zircon and alumina, powdered free $SiO_2$, $Al_2O_3$, and $ZrO_2$ batch constituents in fine particle size. The $ZrO_2$ and $SiO_2$ incorporated in the batch may suitably be derived from dissociated zircon, although the use of dissociated zircon as an essential source of silica and zorconia is not mandatory.

An important advantage of using zirconia, silica and alumina starting materials in the batch is that the starting particle size of the zirconia and the level of impurities in the batch can be carefully controlled. Further, the reaction during sintering occurs between silica, zirconia and alumina instead of zircon and alumina. This approach permits the attainment of high modulus of rupture strengths in the toughened product both at room temperature and at high operating temperatures, e.g., 1200° C.

The ceramic batch for the mullite ceramic article of the invention further comprises reinforcing inorganic whiskers, most preferably SiC whiskers, to enhance the toughness of the ceramic product. Thus the toughening effect of the zirconia in the final ceramic product is amplified and enhanced due to the presence of SiC whiskers therein.

The process for manufacturing a toughened mullite ceramic article in accordance with the invention comprises the initial step of providing a flowable oxide slurry from a liquid vehicle and a mixture of free oxides. The free oxide mixture consists essentially of the oxides $ZrO_2$, $SiO_2$, and $Al_2O_3$, the mole ratio of $Al_2O_3$:$SiO_2$ in the mixture being about 3:2. The concentration of $ZrO_2$ in the mixture should constitute not more than about 40% thereof by dry weight. Suitably a dry batch of appropriate composition is first compounded and then mixed with a liquid vehicle to form a flowable slurry of the oxides in the vehicle, with the slurry generally being milled prior to further processing, if desired. Milling is helpful both to further homogenize the oxide mixture and to reduce the particle size of the constituent oxides.

The SiC whisker component of the ceramic article is introduced into the composition by combining the oxide slurry with a flowable liquid dispersion of SiC whiskers. Preferably, the whiskers are first dispersed uniformly in a second liquid vehicle to form a homogeneous whisker dispersion, and this dispersion is then combined with the oxide slurry to form a liquid mixture. The SiC whiskers in the mixture typically comprise 10–50 wt. % of the solids present therein.

After a homogeneous mixture has been provided, the liquid vehicle is separated from the solid phase and the solids are consolidated at a temperature sufficient to convert the $SiO_2$ and $Al_2O_3$ present therein into mullite. Consolidation can be accomplished by conventional means such as hot-pressing, or a preform can first be provided by isostatically pressing the solids at ambient temperature, and thereafter completing the consolidation and conversion to mullite by pressureless sintering or hot isostatic pressing at temperatures above about 1500° C.

The mullite ceramic article resulting from the above-described process exhibits a density in excess of 98% theoretical and very homogeneous microstructure. Further, through suitable control of the level of zirconia addition to the batch, the article exhibits both excellent room temperature modulus of rupture strength and high strength at 1200° C. The toughness of the product is also considerably enhanced over that of conventional mullite.

The article may be characterized as a fracture-toughened composite mullite ceramic article comprising a mullite-zirconia matrix phase and a SiC whisker reinforcement phase, wherein the matrix phase consists essentially of 15–40% $ZrO_2$ and 60–85% mullite by weight, and wherein the SiC whisker the SiC whisker phase constitutes 10–50% by weight of the article.

DESCRIPTION OF THE DRAWING

The invention may be further understood by reference to the drawing wherein.

DETAILED DESCRIPTION

Figure 1:
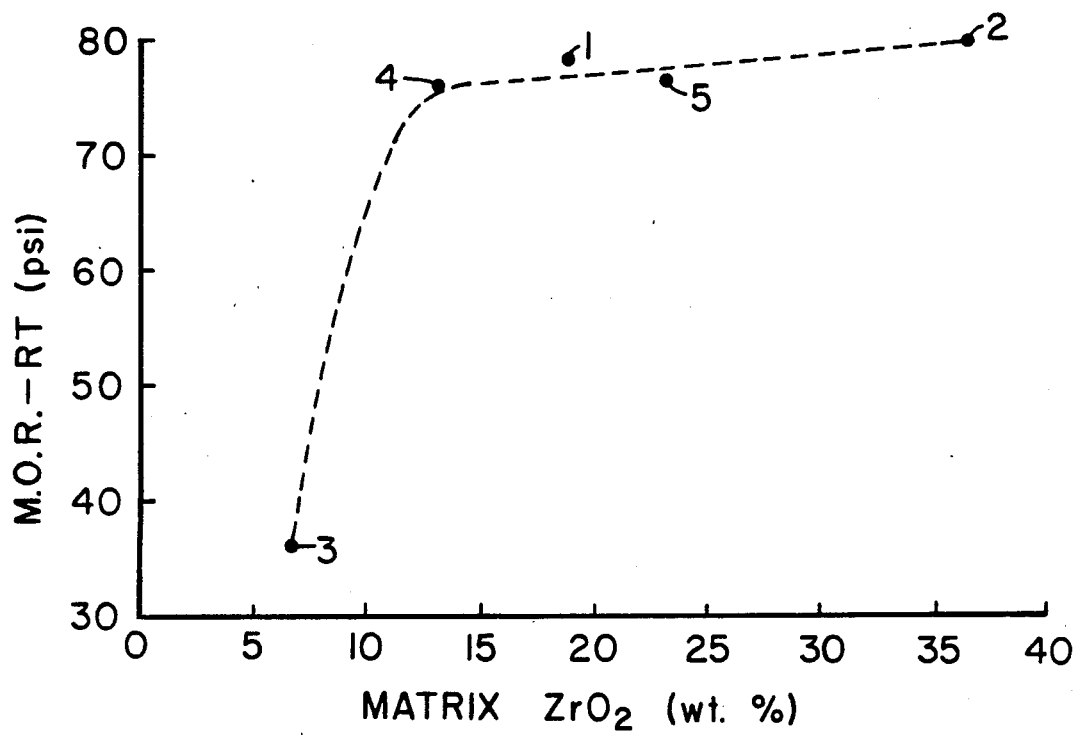
FIG. 1 is a graph plotting room temperature modulus of rupture strength for mullite ceramic articles provided in accordance with the invention.

As previously noted, strong, high-temperature materials have great potential for use in high performance applications such as gas turbine engines, cutting tools, and extrusion dies. Mullite is an attractive matrix material for use in the fabrication of components for such applications, and more particularly for whisker-mullite composites, because of its relatively low thermal expansion, high creep resistance, relatively high melting point and low density.

It has proven difficult in the past to sinter mullite to full density since the crystals formed during sintering tend to be of acicular habit. It is known that the addition of zirconia to mullite tends to prevent the formation of glassy grain boundary phases and also inhibits the formation of acicular grains. Also, it is known that dense mullite-zirconia ceramics can be prepared by adding sintering aids such as MgO, CaO or $TiO_2$ to batches containing zircon and alumina. However, the refractoriness of the resulting mullite matrix is generally reduced by such sintering aids due to the formation of a glassy grain boundary phase upon sintering.

It is also possible to obtain higher density mullite products by controlling the solid state reaction occurring between alumina and zircon through control of the firing schedule. Again, however, this can require a two-stage treatment which may be less economical than a direct method for producing mullite products. Also, since zircon is a natural mineral the impurities in it can vary significantly from location to location, making it difficult to manufacture consistent products.

In the present invention, tough mullite ceramics comprising zirconia are prepared using finely divided silica and zirconia, preferably derived from dissociated zircon, as batch raw materials. As noted, the advantage of using batch materials such as dissociated zircon is that the particle size of the zirconia is smaller, and also that the reaction during sintering can occur among silica, zirconia and alumina rather than between zircon and alumina.

It has also been found important in accordance with the present invention to control the proportion of zirconia present in the mullite batch. More specifically, it has been found that a substantial loss of high-temperature modulus of rupture strength can be exhibited in whisker-composite mullite ceramics produced from combinations of zirconia, silica, and alumina if too little or too much zirconia is present in the batch. This has been found to be especially important in the case of zirconia-containing batches for mullite ceramic products which additionally contain silicon carbide reinforcing whiskers.

The following examples illustrate the preparation of whisker-reinforced zirconia-mullite ceramics employing the process of the invention.

EXAMPLES 1-2

Ceramic mixtures for the manufacture of whisker-reinforced zirconia-mullite ceramic articles are provided from liquid oxide slurries and SiC whisker dispersions in accordance with the following procedure.

Oxide slurries comprising $SiO_2$, $Al_2O_3$ and $ZrO_2$ are first prepared using water as the vehicle in which to disperse the oxides. The silica employed is Minusil powdered silica (5 micron particle size) commercially available from the Pennsylvania Glass Sand Corp., Berkeley Springs, W.V., while the alumina employed is RC-HP-DBM grade alumina commercially available from Reynolds International, Inc. Malakoff, Tex. The dissociated zircon employed is commercially obtained from Z-Tech Corporation, Bow, NH.

Table I below reports slurry compositions used to prepare two different ceramic mixtures suitable for producing mullite crystals. The compositions in Table I are reported in parts by weight, and include weight proportions for the water vehicle and for an added deflocculating agent. The deflocculating agent used is Darvan C, commercially available from the R. T. Vanderbuilt Co., Norwalk, Ct. Also reported for each composition is the zirconia level resulting from the dissociated zircon batch constituent, reported in weight percent of the total of the matrix oxides $ZrO_2+SiO_2+Al_2O_3$.

TABLE I

| Slurry Constituent | Compositions | |
| --- | --- | --- |
|  | Example 1 | Example 2 |
| dissociated zircon ($ZrO_2$ + $SiO_2$) | 279 | 545 |
| $SiO_2$ | 139 | 0 |
| $Al_2O_3$ | 582 | 455 |
| $H_2O$ | 480 | 480 |
| Deflocculating Agent | 24 | 24 |
| Resultant $ZrO_2$ (% weight) | 18.75% | 36.62% |

Slurries having the compositions reported in Table I above are compounded and milled for 90 hours in a vibration mill utilizing zirconia grinding media. This milling process improves the reactivity of the oxide constituents by reducing their average particle size. The resultant particle sizes are below 3 microns, averaging about 1 micron.

A whisker dispersion is next provided by dispersing silicon carbide whiskers in an isopropanol vehicle by high-speed blending. The silicon carbide whiskers employed are Arco SC-9 silicon carbide whiskers, commercially available from the Arco Metals Company, Greer, S.C.

The whisker slurry thus provided is next combined with each of the described oxide slurries to provide a uniform mixture of whiskers and oxides in the vehicle. This is accomplished by adding to each of the oxide slurries a quantity of the whisker dispersion sufficient to provide a whisker content of 25% by weight, based on the weight of total solids, in each of the oxide slurries.

A precipitating agent consisting of ammonium alginate (2 wt. % aqueous solution) is next added to each of the slurries in a proportion providing about 1% by weight of the alginate solution in the slurry. Each slurry mixture is then gelled by the addition of a $CaCl_2$ solution (5 wt. % aqueous). The solids component of each gelled slurry is then separated by filtration and washed with isopropanol, and the washed solids are dried and heat-treated at 550° C. for 2 hours in air.

To obtain consolidation of the solids and conversion thereof to mullite ceramic products, each of the dried solid mixtures is hot-pressed at 1600° C. and 3000 psi for 1 hour under a nitrogen atmosphere. This hot-pressing step consolidates the solids into dense, whisker-containing ceramics wherein mullite constitutes the principal crystal phase and zirconia crystals a uniformly dispersed secondary phase. The fine particulate nature of the oxide solids is such that sintering to greater than 98% of theoretical density is readily achieved at temperatures in the 1400°–1600° C. range, for the matrix material alone.

The strength and toughness of the mullite ceramics provided as described are then measured at room temperature, with high-temperature strength measurements also being carried out. Table II below reports data from such testing, including room temperature strength (MOR-25° C.), high-temperature strength (MOR-1200° C.), and room temperature toughness ($K_{IC}$-25° C.) where determined on the individual samples. Density values for each of the samples are also reported. The modulus of rupture strengths were measured in 4-point flexure and the toughness values determined by single-edge notched beam techniques.

TABLE II

| Test | Properties | |
| --- | --- | --- |
|  | Example 1 | Example 2 |
| MOR-25° C. (psi) | 78,200 psi | 79,700 psi |
| MOR-1200° C. (psi) | 55,500 psi | 41,200 psi |
| $K_{IC}$-25° C. (MPa.m$^{\frac{1}{2}}$) | 5.1 | — |
| Density (g/cc) | 3.4 | 3.61 |

During the high-temperature strength testing of the composite mullite ceramics reported in Table II above, it is observed that the load deflection curves generated during the application of the breaking stress are linear to failure at 1200° C. This indicates that the composite ceramics are substantially free of residual glassy phases.

Based on additional test data of the kind reported above in Table I, it has been determined that the level of zirconia included in the batch has a critical effect on the high-temperature modulus of rupture strength of composite mullite ceramics made according to the invention. The effects of variations in zirconia content on this aspect of the behavior of these ceramics is more fully shown by the following examples.

EXAMPLES 3-5

A further group of oxide slurries is prepared generally following the procedure reported above for Examples 1 and 2. Dissociated zircon, silica, and alumina batch materials are mixed with a water vehicle (a deflocculating agent also being included in the concentration shown in Example 1 above), to provide flowable oxide slurries. The resulting slurries are milled for 90 hours in a vibration mill containing zirconia grinding media.

Table III below reports the compositions for each of three oxide slurries thus provided. Included in Table III for each of the slurries are propertions, in parts by weight, of dissociated zircon, silica, and alumina present in each slurry. Also reported for each of the examples shown is the proportion of zirconia present in the solids component of the oxide slurries, recalculated in weight percent. The solids:liquid ratio in each of the slurries is about 2:1.

TABLE III

| Batch Constituent | Compositions | | |
|---|---|---|---|
| | 3 | 4 | 5 |
| dissociated zircon ($ZrO_2$ + $SiO_2$) | 10.05 | 19.55 | 34.85 |
| $SiO_2$ | 23.01 | 18.0 | 10.14 |
| $Al_2O_3$ | 66.94 | 62.37 | 54.96 |
| $ZrO_2$ (wt. %) | 6.75% | 13.14% | 23.42% |

To each of the slurries reported in Table III above is added a whisker dispersion as described in Example 1, consisting essentially of silicon carbide whiskers dispersed in an isopropanol vehicle by high-speed blending. The addition of the whisker dispersion is sufficient to achieve a whisker content of about 25 wt. % based on the total weight of solids in the resulting mixture.

The mixtures thus provided are gelled and dried as described in Example 1, after which they are filtered and washed successively with water and isopropanol, and then heat treated at 550° C. for 2 hours in air to remove residual organics and water.

Consolidation of the solid batch materials resulting from the described drying process is achieved by hot-pressing each dried filter cake at 1600° C. for 1 hour under a nitrogen atmosphere at 3000 psi. This consolidation is sufficient to react the alumina and silica present in the cakes to form principal mullite crystal phase, comprising both zirconia grains and silicon carbide whiskers as dispersed second phases.

The direct effect of zirconia content on composite strength is shown by strength tests on composites prepared in accordance with Examples 1-5. Samples of each material are subjected to modulus of rupture testing at room temperature and at 1200° C. FIG. 1 of the drawing is a graph plotting the room temperature modulus of rupture strength of such samples as a function of the level of zirconia present in the matrix phase, i.e. exclusive of the whisker phase. The data points on the graph are labeleld with the number of the examples from which the data were derived. Modulus of rupture strength is plotted on the vertical axis with zirconia content being plotted in weight percent of the mullite-zirconia matrix on the horizontal axis.

As indicated in FIG. 1, the room temperature modulus of rupture strength of these whisker-containing mullite ceramics increases significantly with increasing zirconia additions over the range of 5-15% by weight, but reaches a maximum value in that range and is not significantly increased by further zirconia additions.

Figure 2:
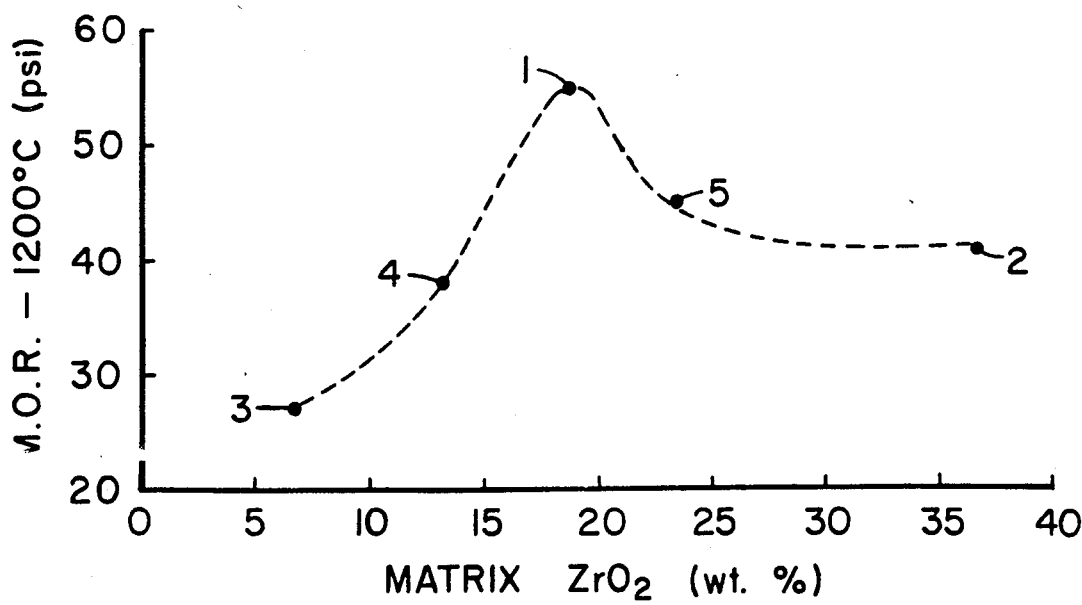
FIG. 2 is a graph plotting the high temperature modulus of rupture strength of mullite ceramic articles provided in accordance with the invention.

FIG. 2 of the drawing is a graph plotting the modulus of rupture strength of whisker-reinforced zirconia-mullite ceramics of Examples 1-5 as tested at 1200° C. Again the modulus of rupture strength is plotted on the vertical axis with zirconia content being reported in weight percent of the mullite-zirconia matrix on the horizontal axis. In contrast to the data represented in FIG. 2, significant enhancements in high-temperature composite strength are recorded as zirconia additions increase above the conventional 5-15 weight percent range However, some deterioration in high temperature strength is observed at zirconia loadings above about 22% by weight.

Based on data such as reported in FIG. 2, we have concluded that composite ceramics wherein the zirconia content ranges about 17-22% by weight of the mullite matrix and the SiC whisker content is about 20-30% by weight of the composite are to be preferred from the standpoint of high temperature strength, for SiC-reinforced zirconia-toughened mullite ceramic articles provided according to the method of the invention. The data suggest that composites exhibiting modulus of rupture strengths in excess of 50,000 psi at 1200° C. can be attained in that range.

While the foregoing examples describe the use of dissociated zircon as a batch material for the preparation of whisker-reinforced zirconia-mullite ceramic articles in accordance with our method, it will be recognized that the invention is not limited to such batch materials, but rather extends to the use of other batch materials which provide the required sources of $ZrO_2$ and $SiO_2$ in free oxide form and in the desired small particle size. And of course, numerous other variations and modifications upon the procedures and examples hereinabove described may be resorted to within the scope of the appended claims.

We claim:

1. A process for the manufacture of a fracture-toughened mullite ceramic article which comprises the steps of:
    (a) providing a flowable slurry comprising free oxides dispersed in a first liquid vehicle, the free oxides consisting essentially of a mixture of $SiO_2$, $Al_2O_3$ and $ZrO_2$ wherein the mole ratio $Al_2O_3:SiO_2$ is about 3:2 and the weight fraction of $ZrO_2$ is in the range of about 15-40% by weight;
    (b) providing a flowable whisker dispersion comprising SiC whiskers dispersed in a second liquid vehicle;
    (c) combining the flowable slurry with the whisker dispersion to provide a mixed dispersion, the combination being in a proportion such that the SiC whiskers comprise 10-50% by weight of the solids present in the mixed dispersion;
    (d) removing the liquid vehicle from the mixed dispersion to provide a solid mixture; and
    (e) reacting the free $SiO_2$ with the free $Al_2O_3$ in the solid mixture while consolidating the mixture to a unitary ceramic article, said reacting and consolidating comprising heating to a temperature at least sufficient to obtain conversion of the free $SiO_2$ and $Al_2O_3$ in the solid mixture to mullite crystals;
    thus to provide a fracture-toughened mullite ceramic article having a room temperature modulus of rupture strength in excess of 70,000 psi.

2. A process in accordance with claim 1 wherein the $SiO_2$, $Al_2O_3$ and $ZrO_2$ free oxides present in the flowable slurry have a maximum particle size not exceeding about 3 microns.

3. A process in accordance with claim 2 wherein the free oxides have an average particle size of about one micron.

4. A process in accordance with claim 1 wherein the free oxides include 17-22% $ZrO_2$ by weight, and wherein the fracture-toughened mullite ceramic article has a modulus of rupture strength in excess of 50,000 psi. at 1200° C.

* * * * *